(12) United States Patent
Turpin et al.

(10) Patent No.: US 12,444,289 B2
(45) Date of Patent: Oct. 14, 2025

(54) CONFINED SPACE MONITORING SYSTEM AND METHOD

(71) Applicant: Weavix, Inc., Wichita, KS (US)

(72) Inventors: Kevin Turpin, Augusta, KS (US); Dylan Turnquist, Wichita, KS (US); Benjamin Burrus, Wichita, KS (US)

(73) Assignee: Weavix, Inc., Wichita, KS (US)

( * ) Notice: Subject to any disclaimer, the term of this patent is extended or adjusted under 35 U.S.C. 154(b) by 173 days.

(21) Appl. No.: 18/499,820

(22) Filed: Nov. 1, 2023

(65) Prior Publication Data

US 2024/0062641 A1    Feb. 22, 2024

Related U.S. Application Data

(63) Continuation of application No. 17/690,505, filed on Mar. 9, 2022, now Pat. No. 11,842,618.

(60) Provisional application No. 63/158,731, filed on Mar. 9, 2021.

(51) Int. Cl.
    *G08B 21/14*      (2006.01)
    *H04W 12/06*     (2021.01)

(52) U.S. Cl.
    CPC .................................. *G08B 21/14* (2013.01)

(58) Field of Classification Search
None
See application file for complete search history.

(56) References Cited

U.S. PATENT DOCUMENTS

| | | | |
|---|---|---|---|
| 7,266,429 B2 | 9/2007 | Travaly et al. | |
| 7,952,486 B2 | 5/2011 | Novoselov | |
| 8,493,223 B2 | 7/2013 | Zadnikar et al. | |
| 9,129,230 B2 | 9/2015 | Lewis | |
| 9,240,116 B1 | 1/2016 | Boushehri et al. | |
| 9,717,074 B2 | 7/2017 | Lu et al. | |
| 10,015,802 B2 | 7/2018 | Matischek et al. | |
| 10,395,021 B2 | 8/2019 | Caso et al. | |
| 10,490,053 B2 | 11/2019 | Hummer et al. | |
| 10,733,869 B2 | 8/2020 | Golob | |
| 10,739,202 B2 | 8/2020 | Shim et al. | |
| 11,080,992 B2 | 8/2021 | Johnson et al. | |
| 11,328,514 B2 | 5/2022 | Vancraybex et al. | |
| 11,368,952 B2 | 6/2022 | Freed et al. | |
| 11,519,809 B2 | 12/2022 | Ziolkowski | |
| 11,523,315 B2 | 12/2022 | Khawer et al. | |
| 2016/0345265 A1 | 11/2016 | Lee et al. | |

(Continued)

FOREIGN PATENT DOCUMENTS

| | | |
|---|---|---|
| WO | 2016005371 A1 | 1/2016 |
| WO | 2018093638 A1 | 5/2018 |
| WO | 2018183789 A1 | 10/2018 |

OTHER PUBLICATIONS

International Search Report and Written Opinion from International Appl. No. PCT/US2018/025322, mailed Aug. 27, 2018.

*Primary Examiner* — John F Mortell
(74) *Attorney, Agent, or Firm* — Avek IP, LLC

(57) ABSTRACT

Disclosed is a system for monitoring confined spaces. The system includes a portable area monitor that operates in a local LTE network, and thus, is included into a cloud-based platform. A Wi-Fi antenna is included in the confined space, enabling communications with both smart communication devices and gas sensors worn by workers while inside the confined space, thus providing cloud network visibility.

20 Claims, 7 Drawing Sheets

(56) References Cited

U.S. PATENT DOCUMENTS

2017/0048650 A1* 2/2017 Javer .................. H04Q 9/00
2018/0336478 A1 11/2018 Bostick et al.
2019/0124194 A1* 4/2019 Stolte ................ H04L 63/083
2021/0014234 A1* 1/2021 Kwatra ............... H04W 4/025

* cited by examiner

CONFINED SPACE MONITORING SYSTEM AND METHOD

CROSS-REFERENCE TO RELATED APPLICATIONS

This application is a continuation of U.S. patent application Ser. No. 17/690,505 filed Mar. 9, 2022, which claims the benefit of U.S. Provisional Application No. 63/158,731 filed Mar. 9, 2021, the disclosure of each of which are hereby incorporated by reference in their entirety.

BACKGROUND

1. Field

Embodiments of this disclosure relate generally to the field of monitoring systems, and more specifically to the field of monitoring confined spaces and workers operating in and around such spaces.

2. Description of the Related Art

Monitoring employees and environmental conditions is important with respect to the practice of conducting inspections of confined spaces, e.g., industrial facilities, processing facilities, refineries, etc. These inspections typically require one or more workers to enter the confined space while another person, a "hole watcher", observes from outside the vessel for safety reasons. Conventionally, the managing of these employees and observation of safety conditions is burdensome, can lead to errors, and in some instances result in dangerous situations. Because of this, it is important to know the whereabouts of employees and recognize the development of dangerous gaseous conditions inside the vessel. It is also important, in hindsight, to be able to prove documentation of employee presence at the site and other compliance issues relating to the inspection.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some aspects, the techniques described herein relate to a system including: a portable independently-powered area monitor wirelessly included in a cloud-based platform using a wireless communications component, the cloud-based platform providing communications between the area monitor and one or more remotely-maintained software systems; a data-transmitting cable, e.g., a POE cable, connectable into the area monitor and extending to an antenna; one or more independently-powered portable wearable smart communication devices, each smart communication device configured to: (i) communicate through the antenna and the data transmitting cable with the area monitor; and (ii) communicate with a wearable gas sensor; and the system being configured to provide the remotely-maintained software systems with one or more of: (i) employee location data from the one or more smart communication devices and (ii) gas data from the wearable gas sensor.

In some aspects, the techniques described herein relate to a system including: a touch-screen display device configured to receive an identifying tag in or on each of the one or more smart communications devices thus enabling the remotely-maintained software systems to identify each of the one or more smart communications devices.

In some aspects, the techniques described herein relate to a system including: a touch-screen display device configured to read an identifying tag mounted in or on each of the one or more smart communications devices thus enabling the remotely-maintained software systems to identify each of the one or more smart communications devices while communicating through the area monitor.

In some aspects, the techniques described herein relate to a system wherein the touch-screen display device is connected to the area monitor through an additional data-transmitting cable.

In some aspects, the techniques described herein relate to a system wherein the identifying tag is an NFC tag.

In some aspects, the techniques described herein relate to a system wherein the antenna is a Wi-Fi antenna.

In some aspects, the techniques described herein relate to a system wherein the data-transmitting cable also transmits power to the antenna.

In some aspects, the techniques described herein relate to a system wherein each of the one or more smart communication devices includes a wireless communications component configured to operate in an LTE network.

In some aspects, the techniques described herein relate to a system wherein the wireless communication component is configured for operation on bands in a range of from 700 MHz up to 2.7 GHz.

In some aspects, the techniques described herein relate to a system wherein the wireless communication component included in the area monitor is configured to operate in a Band 48 CBRS private network in a range from 3550 MHz to 3700 MHz.

In some aspects, the techniques described herein relate to a system wherein the wireless communication component included in the area monitor is configured to communicate using both public and private LTE networks.

In some aspects, the techniques described herein relate to a system wherein one of the remote software systems is configured to analyze gas data received from the gas sensor and recognize dangerous trends.

In some aspects, the techniques described herein relate to a system wherein the system transmits a warning through the area monitor upon identifying a dangerous trend.

In some aspects, the techniques described herein relate to a system wherein one of the remote software systems analyzes worker locational information using information received from the one or more smart communications devices and uses the information to evaluate personnel issues relating to a confined space.

In some aspects, the techniques described herein relate to a confined space monitoring process including: providing a smart communication device having a readable identifier; receiving an employee login into the smart communication device to match the smart communication device with an employee; pairing the smart communication device with a wearable gas sensor device; locating a portable area monitor device outside a confined space; coupling a data transmission line from the area monitor device to an antenna inside the confined space to establish a wireless network inside the confined space; receiving a scanned reading of the readable identifier into the area monitor to establish a presence of the employee at that confined space; and obtaining data from one of the smart communication device or the gas sensor device from inside the confined space through the area monitor.

In some aspects, the techniques described herein relate to a process including: using an NFC tag to include the readable identifier.

In some aspects, the techniques described herein relate to a process wherein: a Bluetooth™ pairing process is used to accomplish the pairing of the smart communication device with the wearable gas sensor device.

In some aspects, the techniques described herein relate to a process including: connecting one or more display tablets with NFC readers either in or out of the confined space; and reading the readable identifier using an NFC reader on the display tablet.

In some aspects, the techniques described herein relate to a process including: providing an LTE network; including the smart communication device and the area monitor in the LTE network; and using the area monitor to transmit data between a cloud platform and the smart communications device when the smart communications device is inside of the confined space.

In some aspects, the techniques described herein relate to a process including: using data received through the area monitor from the smart communications device to manage employees in relation to any work activity performed in the confined space.

BRIEF DESCRIPTION OF THE SEVERAL VIEWS OF THE DRAWINGS

Illustrative embodiments of the present disclosure are described in detail below with reference to the attached drawing figures, which are incorporated by reference herein and wherein.

DETAILED DESCRIPTION

Disclosed is a system for monitoring at a location, e.g., a confined space such as a vessel in a refinery, or really any other sort of confined space that needs monitoring. The system includes an area-monitoring device which is included in one or more wireless networks. In embodiments, the one or more networks might include a public or private Long-Term Evolution (LTE) networks, Band 48 Citizen's Broadband Radio Service (CBRS) private network, Family Radio (unlicensed spectrums), combinations thereof, or some other cellular communications arrangement. In other embodiments, the wireless network could be a facility Wi-Fi or other kind of network. Regardless, the area monitor is configured to receive wireless signals from devices inside a confined space using a wireless (e.g., Wi-Fi) antenna. In embodiments, the antenna is physically electronically connected to the area monitor using a Power-Over-Ethernet (POE) line connection. The POE line connection makes the antenna locatable inside a confined space, e.g., vessel, allowing for Wi-Fi communications therein with numerous other devices. As is known in the art, many vessels prevent communications using conventional wireless systems due to the materials of construction.

The in-vessel antenna arrangement establishes connectivity with smart communication devices discussed hereinafter as well as wearable gas sensor devices, both of which, according to processes utilized will be associated with a particular worker. The smart communication device and gas sensor devices, both paired to a worker, will then be associated/paired with, and communicate through, the area monitoring device.

Figure 1:
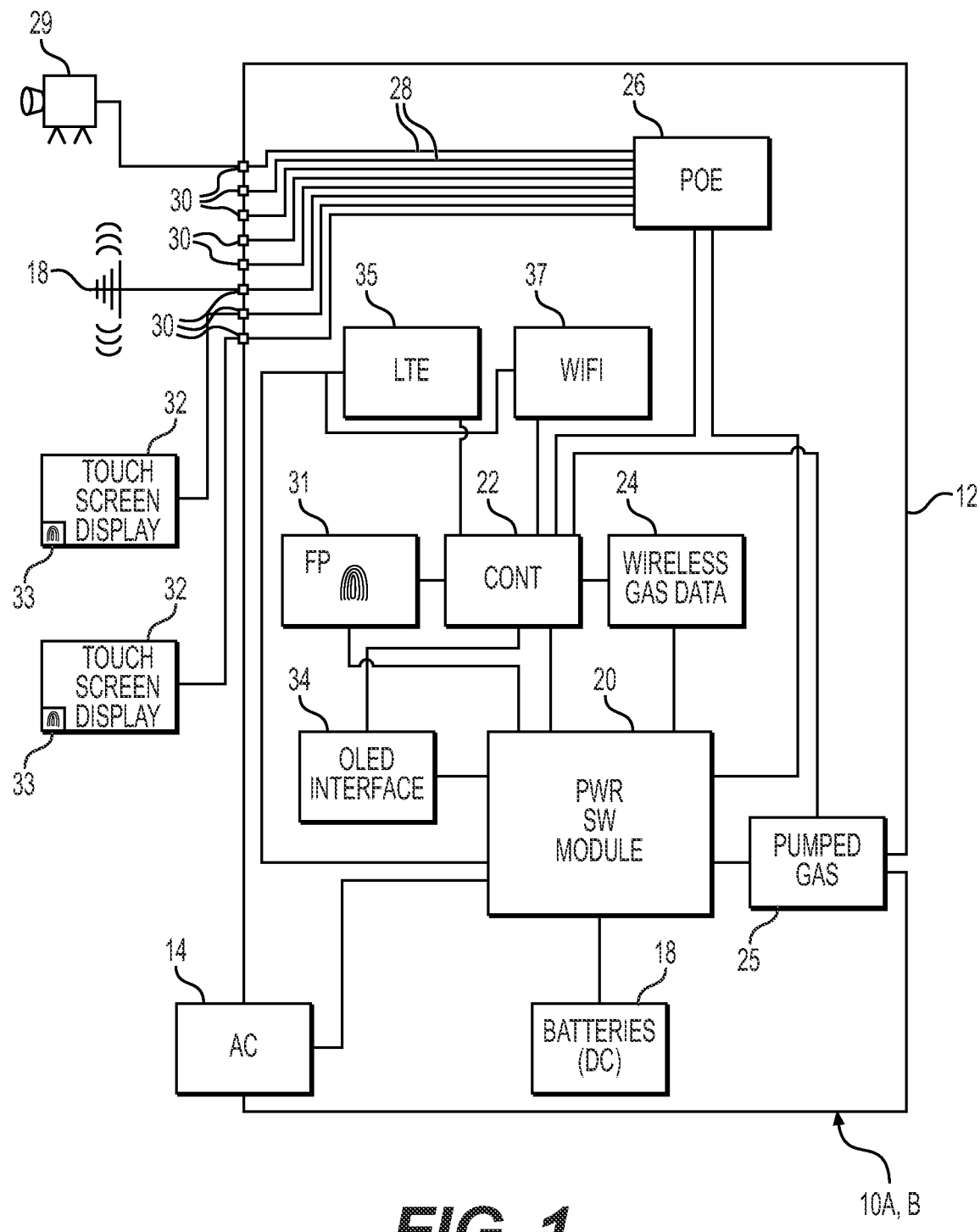
FIG. 1 is a block diagram of an area monitoring device and related subcomponents and communications architecture, in an embodiment.

FIG. 1 is a block diagram revealing an architecture for an exemplary area monitoring device 10A,B (representative of 10A and 10B in later figures). As can be seen in the figure, the system is substantially contained in a housing 12. The area monitor 10A,B can accommodate either AC or DC power sources (AC input 14 or DC battery source 18) depending on the availability to the electrical grid. In an embodiment, four batteries are used for the purpose of meeting power requirements while at the same time establishing redundancy in the case of failure of one of the four batteries. A power switching module 20 cooperates with a controller 22 to switch to battery power when AC power is not available, and thus, AC power, in the disclosed embodiment, is the primary power source and battery power is a backup source.

The controller 22 is given access to a cloud-based network or platform, as further described below. In embodiments, the controller is configured to be included in an LTE or other cellular system using a cellular router 35. In embodiments router 35 along with controller 22 are configured to operate in either private or public LTE networks (e.g., based on 4G or 5G). In some embodiments, these devices are equipped to operate in a Band 48 Citizen's Broadband Radio Service (CBRS) private network. The frequency range for Band 48 extends from 3550 MHz to 3700 MHz and is executed using Time Division Duplexing (TDD) as the duplex mode. In embodiments, public and private LTE capabilities are both offered to give the area monitor to operate in one when the other is not available. Cellular subsystem 35 could be a private or public cellular router capable of operating on any of the 88 different E-UTRA operating bands (ranging from 700 MHz up to 2.7 GHz), and the duplex mode could be either in TDD, or Frequency Division Duplexing (FDD).

In embodiments, the area monitor also includes a local area network (e.g., Wi-Fi) router 37 to allow Wi-Fi access into a local area network at a facility. One example system which might be used in controller 22 is a computing device including an i7, or other similar sort of processor.

Also in the area monitor 10A,B is a wireless gas data handling module/component 24 which will receive and process wireless gas data from wearable gas sensor devices as will be described hereinafter. This component is configured to receive and process wireless gas data from these portable units which are wearable by workers. The module 24 will enable communication with these devices since they are separate from the area monitor, and will be made wirelessly accessible even upon entry into a confined space. In embodiments, the wearable gas sensor device is a conventional Bluetooth™ enabled device (e.g., MultiRAE devices manufactured by the RAE™ Systems, Inc.)

Figure 3:
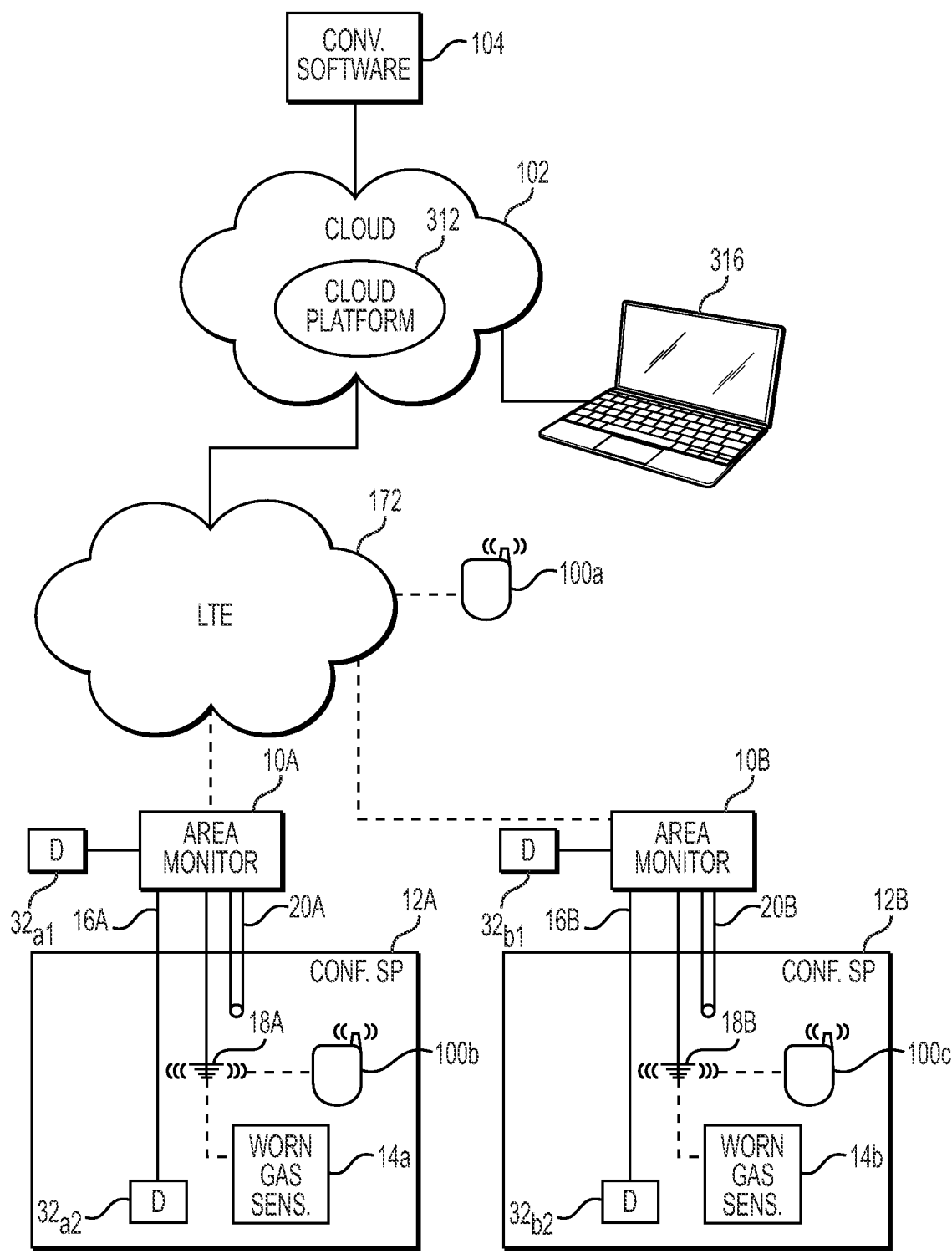
FIG. 3 shows a cloud-based network diagram of an embodiment of the system.

The system also optionally includes a housed conventional gas monitoring device/module 25 which operates by drawing gas from a conduit extended into the confined space (which may be seen in FIG. 3). Data processed from the housed gas pump unit 25 provides redundancy with respect to the data received wirelessly and processed by module 24. This module 25 is additionally made to be in communication with the controller 22 of the area monitor 10A,B which makes any data received available over a cloud network.

The area monitor 10A,B also includes a plurality of Power-Over-Ethernet (POE) ports 30 (eight in the disclosed embodiments) supported by a POE module 26. One or more of the ports 30 can be connected to hard-wired antennas (see FIG. 3) which may be locatable inside one or more confined spaces. Other ports can be connected to cameras (e.g., camera 29), as well as to touch screen devices 32 or other monitoring devices in or outside of the opening to the confined space. Those skilled in the art will recognize that POE connections, in addition to effecting communications, also allow low-power transmission. Thus, devices connected into the POE ports 30 will not require any additional power source and can be electronically connected into and enable communication with the controller 22.

Because one or more POE-connected cameras 29 are connected into an area monitor (e.g., either of monitors 10A,10B), this allows live feed video from cameras inside or outside a confined space or other area to be monitored to be accessible by the controller 22. And because the area monitor controller 22 is made available over the cloud network, this video can be seen by anyone having access to a platform arrangement to be discussed hereinafter.

In embodiments, the area monitor (e.g., monitors 10A, 10B) can be (via the POE ports 30) communicatively coupled to one or more handheld touch-screen display systems 32 which are, in embodiments, smart devices. These touch-screen displays are independent devices equipped with, in embodiments, NFC readers 33. These readers, in embodiments are configured to read NFC tags, as will be discussed. Readings taken by the NFC readers 33 on the touch screen devices 32 can be used to wand workers in and out of a confined space, as well as monitor hole watchers around the confined space as will be discussed. Because the area monitor 10A,10B is included in the cloud-based network or platform, persons accessing the POE-connected touch-screen displays 32 can manually access software systems over the platform to, e.g., file reports, retrieve information, or otherwise send and receive data between the device and the platform software systems. Further, the touch-screen devices 32 can be used to manually login at a work site, e.g., a confined space.

In embodiments, the system also includes an organic light-emitting diode (OLED) pushbutton interface 34. In the disclosed embodiment, the OLED pushbutton interface 34 displays information regarding battery power and push button controls. For example, a power button is configured to power on and off the area monitor. Two other buttons on the OLED pushbutton interface are toggle buttons for toggling through different functions. Using the toggle buttons, a user is able to scroll left and right to toggle through different displayed information. In embodiments, the OLED interface 34 may display: (i) percent of battery life left, (ii) the amount of battery time left, e.g., in hours and minutes, (iii) cellular network signal strength (e.g., LTE strength), (iv) local network strength, e.g., Wi-Fi signal strength, and (v) display of an image of each of the four battery cells, and if one is in default, an indication thereof. Although the signal strength and battery information is displayable on the OLED interface 34, this information is also available in the cloud network since the area monitor device is a wireless network enabled by the LTE 35 and Wi-Fi 37 systems.

Figure 2:
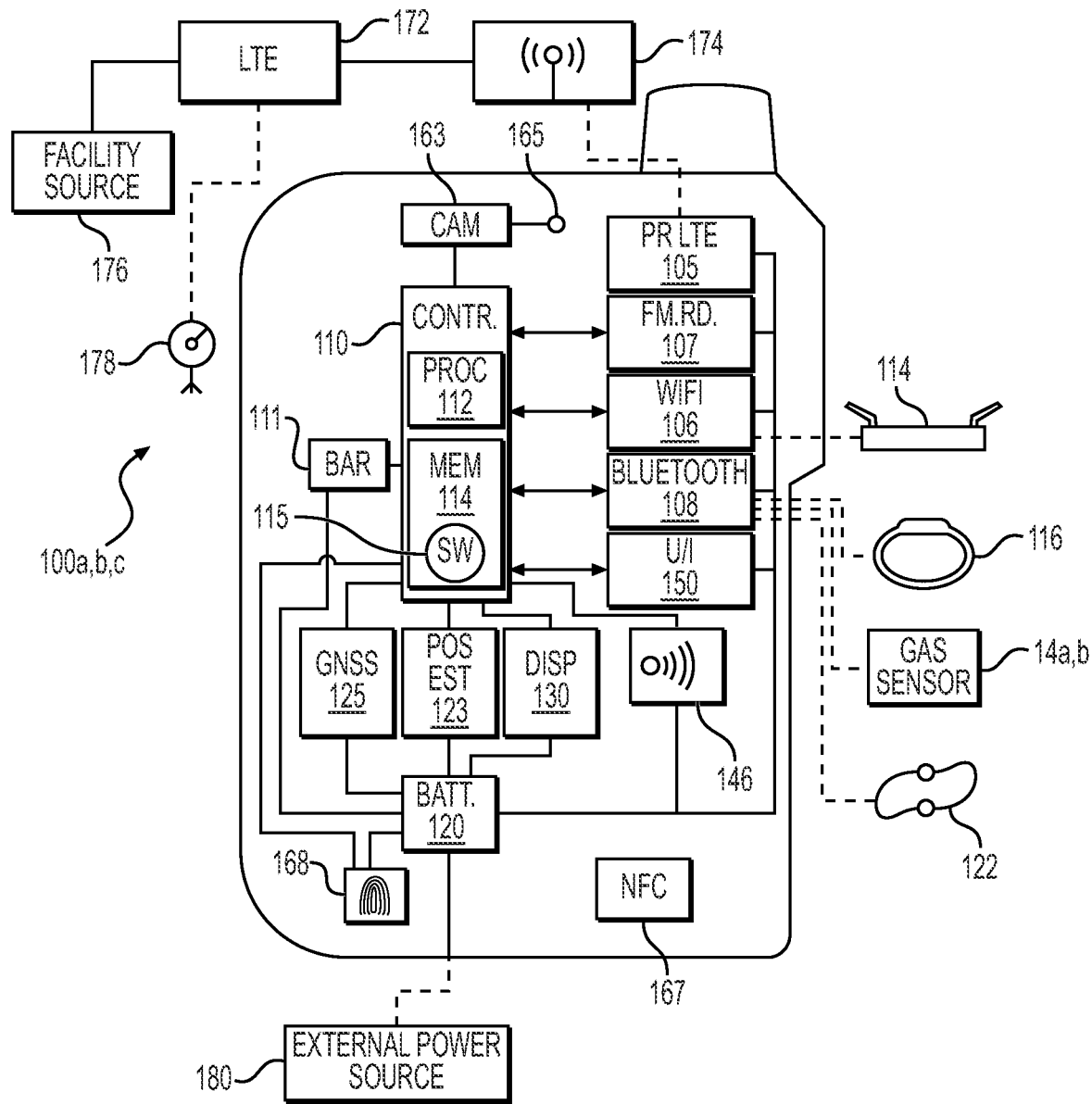
FIG. 2 is a block diagram of a smart communication device along with related subcomponents and communications architecture, in an embodiment.

The area monitors 10A and 10B are useable along with smart communication devices (an example smart communication device 100*a-c* is shown in FIG. 2; and the individual smart communication devices 100*a*, 100*b*, and 100*c* can be seen in FIG. 3 in the way they would appear in the overall system). Referring to the FIG. 2 block diagram an exemplary smart communication device control and communications architecture is disclosed. The communications architecture is incorporated into a portable wireless device 100*a-c* for providing functionality.

The architecture for the smart communications devices 100*a-c* shown in FIG. 2 includes a controller 110 communicatively coupled electronically either directly or indirectly to a variety of wireless communication arrangements, a position estimating component 123 (e.g., a dead-reckoning system which estimates current position using inertia, speed, and intermittent known positions received from a position tracking component 125, which in embodiments, is a Global Navigation Satellite System (GNSS) component), a display screen 130, an optional audio device 140, a user-input device 150, and one of a pair of dual built-in cameras 165 (another camera, not shown, is on the other side of the device) and related camera modules 163 operating inside the device. Certain details regarding the smart communications devices can be seen in U.S. Patent Application Publication No. 2020/0372316 made by Turpin et al. on Nov. 26, 2020, the entire contents of which are herein incorporated by reference.

The smart communication device system includes a Near-Field Communication (NFC) tag 167. Those skilled in the art will recognize that NFC tags are known devices which can be adhered or otherwise incorporated onto things, and can be read using NFC readers, which are available on some devices. It should be understood that the smart communications device 100*a-c* could instead use some other form of readable tag or other implement to accomplish the same purposes. For example, an RFID tag, or other kinds could be used and still fall within the scope of what is disclosed herein.

FIG. 2 also reveals that the smart communications device 100*a-c* includes a fingerprint reader 168, which cooperates with processes running on the controller 110 to validate a user's identity to gain access to the smart communication device 100*a-c*, and may also be used by processes to identify a particular worker from an organization's worker database existing remotely. Those skilled in the art will recognize that these sorts of fingerprint readers can be sensors that capture high-resolution images of a person's fingerprint, which the identification processes on the smart communications device and/or an organizations human resources or other cloud-based software can use to complete an identifying match.

Also in FIG. 2 it can be seen that a battery 120 is electrically coupled with all of a private LTE wireless communication device 105, a Wi-Fi subsystem 106, a Family Radio (unlicensed spectrum) subsystem 107, a Bluetooth subsystem 108, barometer 111, position tracking component 125 (e.g., GPS navigational device), position estimating component 123, display screen 130, audio device 146, user-input system 150, fingerprint scanner 168, and other components for providing electrical power. Battery 120 is also electrically and communicatively coupled with controller 110 for providing electrical power to controller 110 and enabling controller 110 to determine a status of battery 120 (e.g., a state-of-charge). In certain embodiments, battery 120 can be permanently installed, or removable, and capable in embodiments of recharge battery. Relevant battery status information will be, in embodiments, displayed on the outside of the smart communications device 100a-c, and also made available through the cloud network via a platform arrangement discussed hereinafter.

Controller 110 is, for example, a computer having a memory 114, including a non-transitory medium for storing software 115, and a processor 112 for executing instructions of software 115. In some embodiments, controller 110 is a microcontroller, a microprocessor, an integrated circuit (IC), or a system-on-a-chip (SoC). Controller 110 includes at least one clock capable of providing time stamps and displaying time via display screen 130. The at least one clock is updatable (e.g., via user interface 150, GPS navigational device 125, Internet 106, private cellular network 105, and server 170).

The wireless communications arrangement includes a cellular subsystem 105, a Wi-Fi subsystem 106, and a Bluetooth subsystem 108, all enabling sending and receiving to and from the external networks. And the Wi-Fi 106 and Bluetooth subsystem 108 additionally enable communications with the area monitors 10A and 10B.

Referring to FIG. 2, cellular subsystem 105, in a preferred embodiment, enables system 100 to communicate with at least one wireless antenna 174 located at the facility as well as the wireless antenna 18 (see FIG. 1) which is connected via POE to the area monitor 10A,B. These antennas could be either permanently installed or temporarily deployed at the facility. In the disclosed embodiment, an LTE edge router arrangement 172 is provided for implementing a common wireless source. LTE edge router arrangements 172 (a/k/a "edge kits") are known in the art, and usable to include a wireless LTE network into the internet. These arrangements also typically are located near a facilities primary internet source 176, e.g., a fiber backhaul or other similar device. Alternatively, the network could be configured to obtain internet from signals from a satellite source 178, especially in a remotely located facility not having a backhaul source, or where a mobile arrangement not requiring a wired connection is desired. More specifically, the satellite source 178 plus edge router arrangement 172 can, in embodiments, be configured into a vehicle, or portable system.

In many instances, however, the system is installed into the backhaul arrangement at the site. This arrangement, however, affords easy set up since the edge kit 172 can be directly connected to the existing fiber router, cable router, or any other source of internet at the facility.

In an embodiment, one or more Multi-Band Operation (MBO) antennas 174 are deployed at a location in which the devices, e.g., smart communication devices 100a-c, area monitors 10A,B, are to be used. The MBOs can be omnidirectional, directional, or semi-directional depending on the intended coverage area. Collectively, MBOs can create a private wireless network. In embodiments, the network is a private LTE network (e.g., based on 4G or 5G). In some more specific embodiments, the network is a Band 48 CBRS private network.

The private LTE wireless communication device 105 in smart communication device architecture 100 is configured to operate in the private network created, e.g., configured to accommodate Band 48 CBRS in the frequency range for Band 48 (from 3550 MHz to 3700 MHz) and accommodates TDD. Thus, in the preferred arrangement channels within that range could be used for different sorts of communications between the cloud network and the system 100.

In yet other embodiments, a public LTE network might be accessed alternatively to, or along with the private LTE network. Those skilled in the art will recognize that the support systems for a public LTE network will already exist in a location. Thus, no supporting antenna arrangement need be provided.

Thus, in a broad sense the cellular subsystem 105 could be incorporated into a private or public cellular network operating on any of the 88 different E-UTRA operating bands (ranging from 700 MHz up to 2.7 GHz), and the duplex mode could be either in TDD, or Frequency Division Duplexing (FDD). To enable CBRS, those skilled in the art will recognize that the controller 110 is representative of numerous cooperating computing and other devices, in addition to those depicted, e.g., multiple processing and memory components relating to signal handling, an optional SIM card, etc. It should also be recognized that the private network component 105 likely also is comprised of numerous components related to supporting the cellular network connectivity, e.g., an antenna arrangement and supporting processing equipment configured to enable CBRS.

The use of CBRS Band 48 (from 3550 MHz to 3700 MHz) in the preferred embodiment provides numerous advantages. For example, it provides long signal ranges, and smoother handovers. It also has the ability to support numerous devices at the same time. Because in embodiments, each of the smart communication devices (and also other forms of smart devices, e.g., smart phones, tablets) have CBRS-enabling architectures, and thus, might be referred to as Citizen's Broadband Radio Service Devices (CBSDs).

It should be noted that the particular frequency bands used in executing the processes herein could be different, and that the aspects of what is disclosed herein should not be limited to a particular frequency band unless otherwise specified in the claims (e.g., 4G-LTE or 5G bands could be used).

A Wi-Fi subsystem 106 enables system 100 to communicate with an access point 114 capable of transmitting and receiving data wirelessly in a relatively high-frequency band. Wi-Fi might also be useful in testing the device prior to deployment.

The Family Radio module 107 of the smart communication devices allows for communication between these devices as is possible with a standard hand-held two-way radio transceiver. This feature enables traditional worker-to-worker and supervisor-to-worker communications on site. Module 107 thus, provides redundancy in that it will maintain peer-to-peer communications in the event other networks fail, e.g., in an emergency. Although not depicted, module 107 operates on an independent antenna system within the smart communications device.

Bluetooth subsystem 108 enables the user to communicate with a variety of peripheral devices, including a biometric interface device 116, and one or more wearable gas/chemical detection devices 14a,b which includes one or more sensors used to detect noxious gases. It should also be noted that numerous other Bluetooth devices could be incorporated into the system.

As used herein, the wireless systems may be any device capable of simultaneously communicating wirelessly (e.g., via radio waves) with a plurality of other devices (e.g., a plurality of sensors, a remote interface) and optionally with the cloud/internet for accessing websites, databases, etc.

The wireless subsystems 105, 106, 107, and 108 are each configured to transmit/receive data in a proper format, e.g., in IEEE 802.11, 802.15, 802.16 Wi-Fi standards, Bluetooth standard, WinnForum SAS test specification (WINNF-TS-0065), and across a desired range. The operator may connect multiple devices with system 100 to provide data connectivity and data sharing across the multiple devices. In some embodiments, the shared connectivity may be used to establish a mesh network.

The location tracking and position estimating systems 125 and 123 can operate cooperatively. The location tracking system 125, again, can be a GNSS (e.g., GPS) navigational device 125, which receives information from satellites and determines a geographical position based on the received information. The position estimating system location device 125 is used to track the location of smart communication device incorporating architecture 100. In certain embodiments, a geographic position is determined at regular intervals (e.g., every five seconds) and position in between readings is estimated using the estimating system 123.

GPS position data is stored in memory 114 and uploaded to server 170 at regular intervals (e.g., every minute). In some embodiments, the intervals for recording and uploading GPS data are configurable. For example, if smart communication device 100a-c is stationary for a predetermined duration, the intervals are ignored or extended, and new location information is not stored or uploaded. If no connectivity exists for wirelessly communicating with server 170, location data is stored in memory 114 until connectivity is restored at which time the data is uploaded, then deleted from memory 114. GPS data may be used to determine latitude, longitude, altitude, speed, heading, and Greenwich-mean time (GMT), for example, based on instructions of software 115 or based on external software (e.g., in connection with server 170). In certain embodiments, position information may be used to monitor worker efficiency, overtime, compliance, and safety, as well as to verify time records and adherence to company policies.

As an alternative to the locating and estimating tracking process discussed above using dead reckoning system 123 in combination with GNSS system component 125, a Bluetooth tracking arrangement using beacons might be used instead. For example, Bluetooth component 108 could receive signals from Bluetooth Low Energy (BLE) beacons. The BLEs could be strategically located about the facility and the controller 110 may be programmed to execute relational distancing software using beacon signals (e.g., triangulating between beacon distance information) to determine device position. Regardless of the process, component 108 detects the beacon signals and the controller calculates roughly the distances used in estimating location.

Another alternative locating arrangement with the smart communication devices 100a-c is the use of UltraWideBand (UWB) with spaced apart beacons. The beacons are small battery powered sensors that are spaced apart in the facility, and broadcast signals that can be received by a UWB component are included in the smart communication device. Once equipped with the devices, the worker's position can be monitored throughout the area over time.

Whereas the location sensing GNSS and estimating systems 125 and 123 (FIG. 2) can be used to primarily determine a horizontal location, the barometer component 111, in embodiments, can be used to determine a height (or cooperate with GNSS to determine a height) using known vertical barometric pressures at the facility. With the addition to a sensed height, a full three-dimensional location can be determined by the processor 112. This is useful in determining if a worker is, e.g., on stairs or a ladder, atop or elevated inside a vessel, or in other relevant locations.

An external power source 180 in FIG. 2 is optionally provided for recharging battery 120. The battery, in embodiments, is made to be receivable into a charging station (not shown) along with a plurality of other smart communication devices. Smart communication device architecture 100 may include a connector enabling connecting to the external power source 180. Example power connectors include a universal-serial bus (USB) or firewire port for plugging in to a direct current (DC) power source. In certain embodiments, smart communication device system 100 includes a USB Type-C charging port. In some embodiments, rapid recharging is provided (e.g., up to 65% of full battery charge is provided within ten minutes).

Display screen 130, which could, in alternative embodiments, be a touch screen, is for example a liquid-crystal display (LCD), an e-ink display, an organic light-emitting diode (OLED), or other digital display capable of displaying text and images. In some embodiments, display screen 130 uses a low-power display technology, such as an e-ink display, for reduced power consumption. Images displayed using display screen 130 include but are not limited to photographs, video, text, icons, symbols, flow charts, instructions, cues, and warnings. For example, display screen 130 may display (e.g., by default) an identification style photograph of an employee who is wearing smart communication device 100a-c such that the smart communication device replaces a traditional badge device worn by the employee. In another example, step-by-step instructions for aiding the operator while performing a task are displayed via display screen 130. In some embodiments, display screen 130 may lock after a predetermined duration of inactivity by an operator to prevent accidental activation via user-input device 150. (See FIG. 2; additional description below).

Optional audio device 140 optionally includes at least one microphone (not shown) and a speaker 146 for receiving and transmitting audible sounds, respectively. Although only one speaker 146 is shown existing in architecture image FIG. 2, it should be understood that in the actual physical embodiment, multiple speakers (and also microphones used for the purpose of noise cancellation) are utilized such that the device can adequately receive and transmit audio. In certain embodiments, an operator speaks commands to smart communication device 100a-c, in which the microphone receives the spoken sounds and transmits signals representative of the sounds to controller 110 for processing. In some embodiments, audio systems 140 disseminate audible information to the operator via the speakers (not shown) and receives audible information via a microphone (also not shown). Audible information may include instructions, reminders, cues, and/or warnings to the operator and may be in the form of speech, bells, dings, whistles, music and other attention-grabbing noises without departing from the scope hereof. One or more speakers may be adapted to emit sounds from the smart communication device 100a-c. In embodiments, the speaker 146 is a high-decibel speaker (e.g., 105 decibels at 800 MHz in an embodiment) capable of being heard when a worker is wearing ear protection (e.g., noise cancelling gear, ear plugs). For example versions sounding at levels greater than 85 decibels at 800 MHz to 115 decibels at 800 Mhz.

A user-input system 150 (see FIG. 2) is adapted for receiving user inputs (e.g., using buttons) and transmitting the user inputs to controller 110. User-input may include any user-input means including but not limited to touch inputs (e.g., using buttons), audible commands, keyboard, etc. Where button inputs are received into the controller, these inputs can cooperate with the display 130 to enable scrolling, menu selections, etc., to operate the device.

The device 100 can also be configured to receive photos (via Bluetooth) from other kinds of external cameras. These may be wearable devices such as cameras mounted to glasses or helmets, such that the camera may provide a forward-facing view from the perspective of the operator while being operated hands-free. The external camera might provide an internal view of the contained area, and can be positioned on a gimbal, swivel plate, rail, tripod, stand, post, and/or pole for enabling movement of the camera. Camera movement may be controlled by the operator, under preprogrammed control via controller 110, FIG. 1, or via another (separate) control mechanism.

In certain embodiments, a plurality of views may be displayed on visualization device 130 from the built-in cameras (which are represented as one camera 165 in FIG. 1). Selection and enhancement (e.g., scrolling, panning, zooming) of views may be provided via the user-input device 150, for example. Additionally, referring back to FIG. 1, any video received into the area monitor from POE connected camera 29, because of the connectivity between the two devices, can be shown on visualization device 130 so that a worker can see outside of the confined space.

Advantages of smart communication device 100a-c include its ease of use for carrying in the field during extended durations due to its small size, relatively low power consumption, and integrated power source. In certain embodiments, smart communication device 100a-c is sized to be small and lightweight enough to be worn at all times by an operator.

Again, many implementations might instead involve the use of stationary temporary or permanently installed LTE sources (e.g., like kit 172) that obtain network access through a fiber or cable backhaul, and thus, the devices are not mobile. In alternative embodiments, a satellite or other internet source could be embodied into a hand-carried or other mobile system, e.g., bag, box or other portable arrangement.

FIG. 3 depicts how area monitors 10A and 10B might be located at confined spaces 12A and 12B, in an embodiment, and coupled with cloud-centered network arrangement otherwise known as a Cloud-Based System. Each confined space 12A or 12B might, e.g., be a vessel in a refinery or other processing plant, or really any other sort of confined space that requires monitoring. As can be seen in FIG. 3, POE lines 16A and 16B are run from the area monitors 10A and 10B outside of the confined spaces 12A and 12B, and through an opening (e.g., doorway) into the internal spaces and used to support antennas 18A and 18B, respectively.

Gas transmitting conduits 20A and 20B also extend from the area monitors 10A and 10B to the confined space internals such that they can draw gases from inside the confined space for testing inside the area monitors in a known manner using the gas measurement module 25 inside each area monitor. The modules 25, as is well known in the art, each include pumps that create a vacuum that is used to draw the gas through each respective conduit (e.g., conduits 20A and 20B).

Referring to the figure, it can be seen that the system centers around a cloud network 102. The area monitor devices 10A and 10B as well as the smart communication devices (e.g., smart communication devices 100a-c) are all accessible over cloud network 102 through a wireless network 172, e.g., a public or private LTE network in embodiments. In the disclosed embodiment, each area monitor 10A,B is dually equipped with public LTE, as well as private LTE (e.g., CBRS Band 48) networking or some other cellular wireless capabilities. Again, instead of an LTE or other sort of cellular network, it may be preferred to utilize a facility Wi-Fi network as network 172. These capabilities could be incorporated into the area monitors instead of, or in addition to the LTE capabilities. Thus, these disclosures should not necessarily be limited to any particular sort of wireless network unless otherwise specified in the claims.

The area monitor devices 10A and 10B are relatively small, and thus, easily carried from location to location. Therefore, in a confined space monitoring capacity, the area monitors 10A and 10B could each be located outside and near an entry way opening (referred to as a "hole" in the field) with the intention of monitoring that confined space for the protection of workers.

Because the area monitors 10A and 10B are wirelessly enabled, they can be completely self-contained. For example, there is no need for burdensome cables extending from facility computing equipment as is necessary in conventional systems. This enables the monitors 10A and 10B to be carried from location to location with ease, and eliminates the need for what can be very long cables that can create tripping hazards as well as other disadvantages. Set up time is also greatly reduced as a result.

The smart communication devices 100a-c might be worn by employees or independent contracted workers at a facility. Numerous other devices could be utilized in combination with an established cellular network 110 (e.g., CBRS Band 48 in embodiments) to provide the ability to access the conventional software applications 104, such that these applications can utilize information received from the devices, e.g., monitors 10A and 10B, communication devices 100c, etc.

FIG. 3 reveals that a cloud platform 312 is what executes the functions (which are saved on a database) necessary to enable numerous software systems 104 utilized as a services suite. This enables interfacing between the conventional software systems 104 and the area monitors 10A,B as well as the smart badges 100a-c. The cloud platform 312, in embodiments, can be configured by a graphical user interface on a computing device 316 operated by an administrating organization providing data retrieved from devices 10A,B and 100a-c to the numerous existing facility-related software systems 104, and also enabling these devices to access these software systems. For example, the functionality desired to create the interplay between the area monitor devices 10A,B, the smart communication devices 100a-c and other devices operating the conventional software systems 104 can be configured on a cloud database by an organization interested in monitoring employees, transmitting alerts to these employees based on determinations made by the platform 312, etc. Amazon Web Services (AWS) and Google Cloud Platform (GCP) are widely used examples of this sort of cloud platform, but others could be used instead.

Examples of data transferred to and from the area monitors 10A,B include: (i) live feeds of video inside or outside of the confined spaces 12A and/or 12B received from cameras (not shown) connected to POE cables 28 extending from the housing 12 and processed by the controllers 22 for the area monitors 10A,B; (ii) live video received from cameras on the smart communication device devices 100b and 100c deployed inside the confined spaces 12A and/or 12B; (iii) gas sensor data received from the gas sensors 14a and 14b located inside the confined spaces; (iv) biometric data received from device 116 and communicated to the area monitors 10A and 10B after being received over Wi-Fi from the smart communication devices 100b and 100c; etc.

Data downloads to the area monitors 10A and 10B might include software updates, device configurations (e.g., customized for a specific operator), location save interval, upload data interval, and a web application programming interface (API) server uniform resource locator (URL).

Examples of data received to and from the smart communication devices can occur over the cellular network 172 for any smart communication device located outside of a confined space (e.g., smart communication device 100a), and will occur through the area monitor (monitors 10A or 10B) for smart communication devices located inside of a confined space (e.g., smart communication devices 100b and 100c). Information transferred could include software updates, device configurations (e.g., customized for a specific operator), location save interval, upload data interval, and a web application programming interface (API) server uniform resource locator (URL).

FIG. 3 also reveals touch-screen display devices $32_{a1}$, $32_{a2}$, $32_{b1}$, and $32_{b2}$. As can be seen, display $32_{a1}$ has been located immediately outside the confined space 12A, and display $32_{a2}$, has been located inside the confined space 12A. It is also seen that both display devices $32_{a1}$ and $32_{a2}$ are connected into the area monitor 10A via POE connection. Similarly, display $32_{b1}$ has been located immediately outside the confined space 12B, and display $32_{b2}$, has been located inside the confined space 12B. Both display devices $32_{b1}$ and $32_{b2}$ are connected into the area monitor 10B via POE connection. All of the displays $32_{a1}$, $32_{a2}$, $32_{b1}$, and $32_{b2}$ allow workers to log in and out of the particular areas they are in using the NFC tags on the smart communication devices. For example, a worker whose job is to watch a particular opening of the confined space 12A, might be required to check in using display $32_{a1}$, but a worker assigned to work (e.g., do an work activity) inside the vessel 12A might check in using display $32_{a2}$. The same is true regarding confined space 12B, where a hole watcher might check in using display $32_{b1}$, but a worker assigned to work (e.g., do an work activity) inside the vessel 12A might check in using display $32_{b2}$. The details regarding the check-in process will be discuss hereinafter. Alternatively, since the touch-screen displays $32_{a1}$, $32_{a2}$, $32_{b1}$, and $32_{b2}$ have access to the cloud via the area monitors 10A and B, a worker can manually login using the display.

Figure 4:
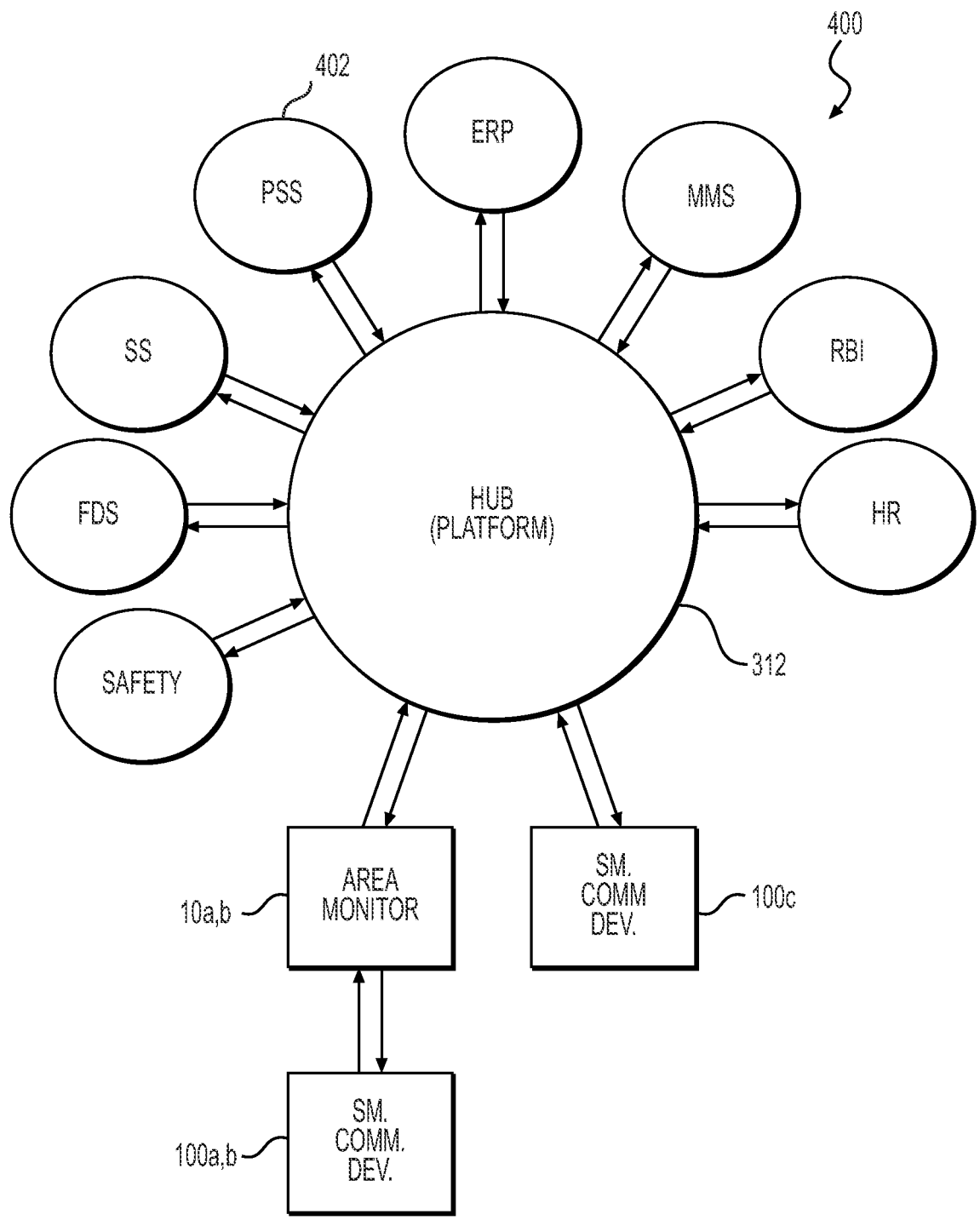
FIG. 4 depicts data-flow process diagram reflecting a hub created for the implementation of embodiments.

FIG. 4 depicts an exemplary data-flow process diagram 400 enabled using a platform/hub 312 created for the implementation of embodiments. The FIG. 4 hub data flow disclosed is a cloud-based software hub created to integrate the numerous facility computer software applications 104. As can be seen in FIG. 4, these might include, Permitting Software Systems (PSS) 402, Scheduling Systems (SS), Field Data Management (FDS) systems, and/or Enterprise Resource Planning (ERP) software systems, which are used to track and plan for the use of facility equipment and other resources. PSS 402 may be specific to specific requirements implemented by government or other entities regarding the continual monitoring of, e.g., (i) employees in and out of confined spaces, e.g., 12A and 12B; (ii) limiting the access of employees in and out depending on conditions, etc. Manufacturing Management System (MMS) software is used to manage the production and logistics processes in manufacturing industries, e.g., for the purpose of reducing waste, improving maintenance processes and timing, etc. Risk Based Inspection (RBI) software assists the facility using optimizing maintenance business processes to examine equipment and/or structures. RBI, more specifically, can use decision making software processes to make work plans more efficient. Further, risk of failure is set at an "acceptable" level, and inspections, repairs, and replacements are used to make sure that risk remains below what is acceptable. See, e.g., U.S. Pat. No. 9,672,486 issued to Turpin, the entire contents of which are herein incorporated by reference.

The facility 416 may utilize Human Resources (HR) software which is responsible for tracking employee time, and can in versions, interact with employee card readers or other devices to track and record when an employee enters a particular facility, or portion of a facility, and at what time each entry occurs. Often, conventionally, the employees each have identifying cards which include an RFID tag, and an RFID transponder is located at each point of access. According to the processes herein, an employee scans an NFC tag which is in or on the smart communication device, and this allows access into the facility, and also the facility system records the time access was granted, and this data is now available to the platform over the cloud. The smart communication device can also be used to scan NFC tags at locations, e.g., vessels and equipment. Herein, the smart communications devices are equipped with the ability to read NFC tags, and these tags can also be used for the purpose of identifying an employee, and pairing the device with the employee, as well as other devices. Regardless, the arrangement disclosed in FIG. 4 enables a user to be identified and the HR software can use that information for monitoring and other purposes.

Ordinarily, in conventional arrangements, each of the facility software applications are accessed one at a time. E.g., a user in a facility may call up the facilities ERP application on a computing device at the facility. Once that task is completed, the user, still on the computer, will open the MMS software to execute tasks. Then, after that, the user may call up the RBI application. And then the same thing for the HR application. Thus, the software products are called up one after the other (e.g., PSS 402, Safety, FDS, SS, ERP, MMS, RBI, HR, or other software systems for a refinery embodiment) for use by the hand-held devices all at once. The area monitors 10A and 10B, smart communication devices 100a-c, and any other wireless device on the system can have immediate and continual interfacing and data exchange through the platform 312. Since the cloud platform 312 is a cloud-based application that is used to interface with the many traditional facility applications, it can send and receive commands and data back and forth between the software systems 104 and the devices (e.g., area monitors 10A and 10B, smart communication devices 100a-c, or other devices, e.g., smart phones, tablets). These communications might include the transmission of warnings, etc.

The hub arrangement 312 can also be configured to send communications to the area monitors 10A,B and smart communication devices 100a-c based on analysis conducted using the software systems 104. This enables the area monitors 10A,B, smart communication devices 100a-c, and supervisors or administrators (e.g., through computing device 316) to receive warnings, etc., generated as a result of analysis conducted. For example, computer analysis conducted by the PSS software 402 identifying a trending increased presence of a dangerous gas detected by sensors 14a and 14b could result in an alarm being transmitted to a supervisor through smart communication devices (e.g., smart communication device 100a) or to computer interface 316. It also enables the user to be tracked in terms of the presence of persons in and out of the hole. For example, video data received from the cameras, or tracking data received from the smart communication devices 100a-c could be used by the PSS software 402 to determine that workers are in the hole, but no one is registered as watching the hole, as is required.

In embodiments, remote battery monitoring processes could also be executed over the hub, e.g., if the batteries in an area monitoring device (e.g., devices 10A, 10B) are low, predictive or other battery monitoring software 104 might exist over the cloud network 102 on a remote computing device 316 and administer alerts that battery power for an area monitor is low. Thus, the information on the area monitor, e.g., percent battery life left, battery time left, LTE Strength, Wi-Fi strength, and any particular battery in default can be recognized and analyzed remotely.

The software, in embodiments, could be predictive. Thus, using the arrangement of FIG. 3 as an example, it can be seen that an alert might be administered from the remotely executed software process to any of the area monitors, e.g., monitors 10A and/or 10B, so that people inside or outside the confined spaces 12A and/or 12B will be informed. Alerts might also be sent to smart communications devices 100b and/or 100c so that a worker wearing the badge inside a confined space will be informed, or to smart communications devices 100a so that a supervisor will know of the issue.

The communication devices 100a-c can track not only the current location of the employee but can also look at the recorded locational information (e.g., of employees 306 at the facility 300 in FIG. 3). Because the area monitors 10A and 10B and smart communication devices 100a-c are able to interface through the hub 312, both have simultaneous access to the diverse applications. This enables a locational record to be analyzed to determine how well various personnel and other device users are doing in performing various tasks. So, for example, if an employee is required to remain at a hole for a confined space, a location record will reveal if that person tends to stray from their post. Where an employee is inspecting a particular vessel in a refinery, it may be necessary for them to spend an hour doing the work. If the locational data record reveals that the inspector was only physically at a vessel for two minutes, this is an indication of hasty or incomplete work. Additionally, remote software systems may be used to analyze worker locational information using information received from the one or more smart communications devices. The information may be used to evaluate personnel issues relating to a confined space.

The area monitors 10A and 10B in combination with the employee-worn smart communication devices 100a-c (as well as the numerous other devices in the system) can be used along with the peripherals shown in FIGS. 1-3 to accomplish a variety of objectives. For example, workers are often equipped with Bluetooth enabled gas-detection devices (e.g., gas sensors 14a and 14b in FIG. 3). These devices detect the existence of a dangerous gas, or gas level, using sensors, and are self-contained systems. The connection between the gas sensor devices 14a and 14b and the area monitoring devices 10A and 10B can occur in two ways. First, the Bluetooth signals from the gas sensors 14a and 14b can be directly received by the area monitors 10A and 10B using the Bluetooth capabilities of both. Alternatively, the gas sensors 14a and 14b can communicate initially with the smart communication devices 100b and 100c over Bluetooth, and then the smart communication devices 100b and 100c can each communicate with the area monitors 10A and 10B to get access to the LTE network 172.

Furthermore, the biometric device (e.g., incorporating heart rate, moisture sensors, etc.) can, via hub 312, put the smart communication devices 100b and 100c in communication with a biometrics analysis system operating either on the hub 312, or on one of the software systems 104 to detect danger indicating a biometric condition of the wearer. Thus, heart rates, dehydration, and other biometric parameters can be monitored and analyzed by the hub system. And these values can be evaluated along with the gas data received from the gas sensor devices 14a and 14b to draw situational conclusions which would otherwise be impossible without the hub arrangement of FIGS. 3 and 4. The system also allows warnings to be transmitted to the area monitors 10A and 10B, smart communication devices 100a-c or a supervisor through device 316 (which can be a wireless device or a desktop), as well as anyone else having security access over the cloud network.

Figure 5A:
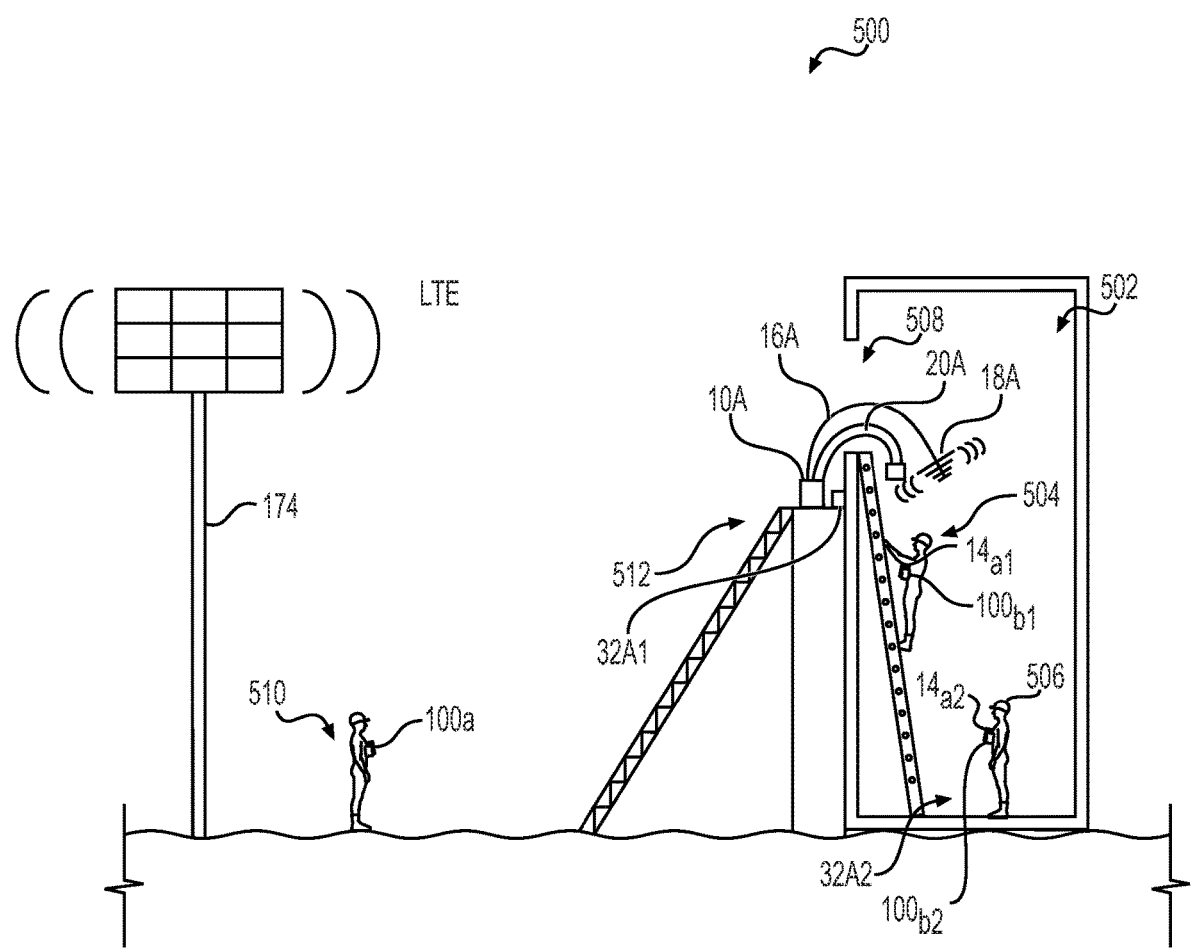
FIGS. 5A and 5B depict a confined space environment in which the monitoring system can be utilized in embodiments.

FIG. 5A shows an environment 500 in which the systems and methods above might be implemented. The environment 500 includes a confined space 502 in which a first worker 504 and a second worker 506 are working. Entry into the vessel is made through door opening 508 as shown. As is normally the case, an outside person 510 or "hole watcher" as it is referred to in the field, is assigned to remain at the hole and watch for any signs or trouble. The hole-watching task is normally required by governmental regulation.

As can also be seen, all three workers 504, 506, and 510 are each equipped with a smart communication device. More specifically, worker 504 is equipped with smart communication device $100b_1$, worker 506 is equipped with smart communication device $100b_2$, and the hole watcher 510 is equipped with smart communication device 100a. The smart device 100a worn by hole watcher 510 is able to be in LTE communication with LTE network source 174 directly. The workers 506 and 508, however, since they are located inside of the confined space 502, are not able to wirelessly communicate with the LTE source 174 directly since the confined space is oftentimes constructed of metal thick enough to block the LTE signal.

To overcome this obstacle, LTE access to smart communication device $100b_1$ on worker 504 and smart communication device $100b_2$ on worker 506 is enabled through the Wi-Fi antenna 18A which is connected to the area monitor 10A via POE cable 16A. This enables wireless Wi-Fi communications between the area monitor 10A and thus, the transmission of data from both the communication devices $100b_1$ and $100b_2$ as well as gas sensors $14a_1$ and $14a_2$ in and out of the confined space 502. Thus, area monitor 10A creates not only the ability to communicate wirelessly inside the confined space 502, but also gives platform 312 access to and from all of the devices inside the confined space 502. Since smart communication devices $100b_1$ and $100b_2$ as well as gas sensors $14a_1$ and $14a_2$ are now a part of the overall network and have access to the cloud platform 312, these devices also have the ability to send and receive data over the network for remote use and analysis.

Figure 6:
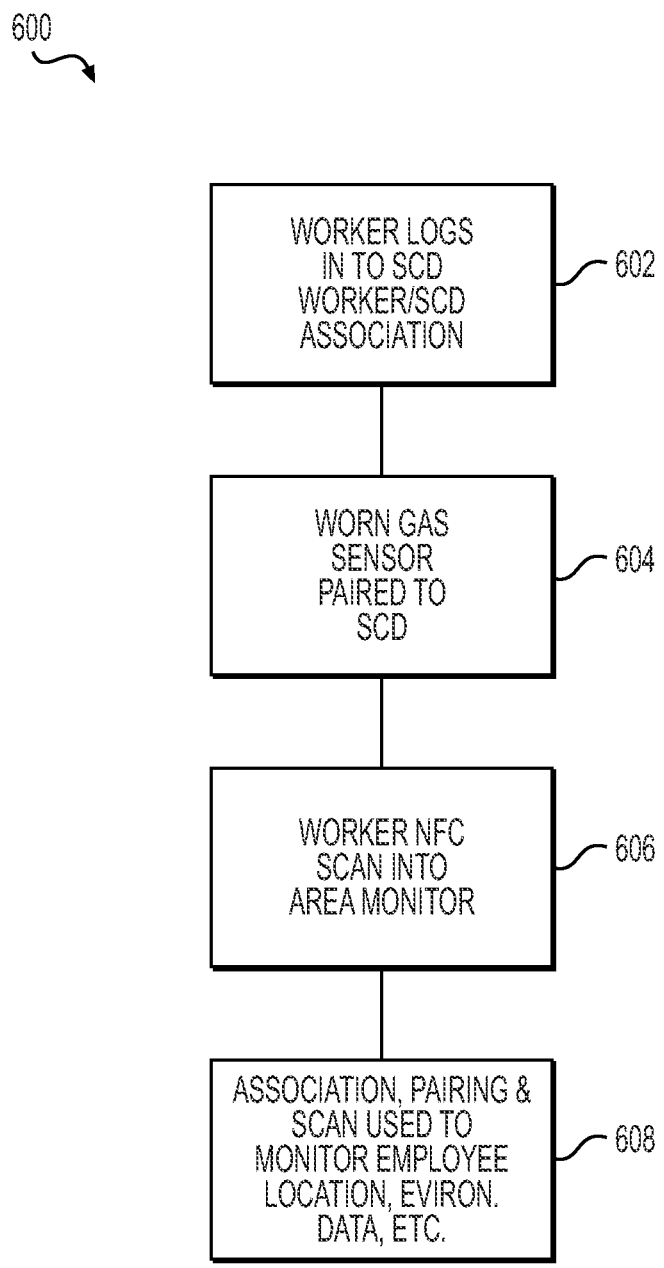
FIG. 6 is a flow diagram revealing a matching process used to identify a particular employee associated with a particular smart communication device and a particular gas sensor at a particular area monitor.

FIG. 6 discloses an embodiment of a process 600 that can be executed using the systems described above. As a preliminary to the process shown in FIG. 6, an entity might present both the smart communications devices and gas sensor devices on charging stations at a location at which workers check in for work for a task that day. Thus, the steps discussed below can be a part of a daily employee routine for employees.

Figure 5B:
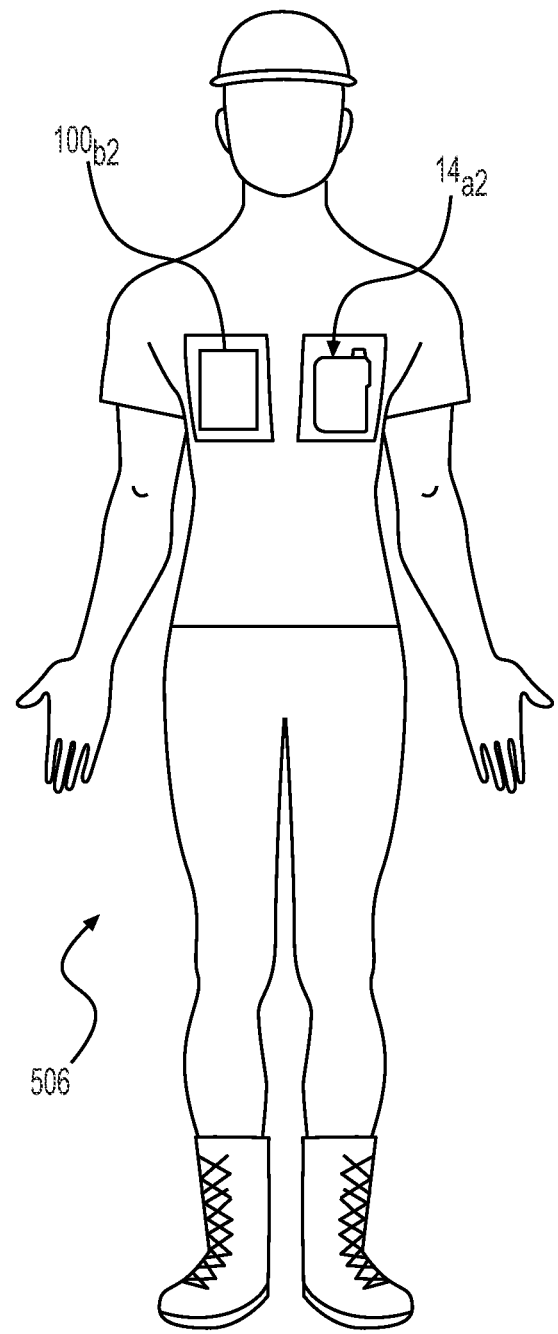

In a step 602, each smart communications device (SCD) (e.g., 100a-c in FIG. 3; devices $100b_1$ and $100b_2$ in FIGS. 5A and 5B) is associated with a particular worker, e.g., workers 504, 506, and 510. In embodiments, each worker engages in a login process that matches that worker with a particular smart communications device. More specifically, in embodiments, this might involve the worker scanning or entering an employee identifier and/or a phone number into the device (or both if a two-step verification process is desired). Alternatively, the fingerprint reader 168 and related identification processes might be used instead of, or along with these processes. Regardless, the identification, when received on login, associates the particular smart communications device with a particular worker (e.g., in FIGS. 5A and 5B, smart communications device 100$b_2$ would be associated with worker 506 on login). Alternatively, a worker can login using a particular tablet touch-screen display 32$_{a1}$, 32$_{a2}$, 32$_{b1}$, and 32$_{b2}$ to manually login since platform access is provided by whatever area monitor the particular display is connected into.

After the login is completed, a wearable gas sensor device (e.g., device 14$a_1$ or 14$a_2$) is paired with the smart communications device in a step 604. To do this, in embodiments, the worker initiates a wireless device pairing process on the smart communications device he or she is in possession of. In embodiments, Bluetooth pairing algorithms on the smart communications device are used to communicate with known processes operating on a Bluetooth enabled gas sensor device to pair the two. Because the location-tracking smart communications device is already associated with the particular worker, the pairing of a gas sensor device with that smart communications device (in step 604) enables the platform 312 (see FIG. 4) to not only track worker locations (determined by the GPS systems on the smart communications device) in real time, but also real-time environmental conditions in and around the worker using the gas sensor. Although Bluetooth pairing processes have been disclosed as usable for the pairing of a particular smart communications device with a particular gas sensor, those skilled in the art will recognize that other processes could be used instead to establish a matching up of a particular smart communications device with a particular portable wearable gas sensor. Thus, the disclosed processes for smart communications device/gas sensor pairing should not be considered limiting unless otherwise specified in the claims.

In a next step 606, if the worker is about to do work inside or outside a particular confined space (e.g., space 502 shown in FIG. 5A), that worker will scan the NFC code 167 in or on the smart communications device 100$_{a,b,c}$ into an NFC reader 33 existing on one of the display tablets 32$_{a1}$ or 32$_{a2}$ associated with area monitor 10A,B that has been deployed at that particular confined space, e.g., confined space 12A. Most likely, a worker outside the confined space will check in using device 32$_{a1}$ and a vessel-internals worker will sign in using tablet 32$_{a2}$. Scanning in will match that particular employee and smart communications device (already paired with a particular wearable gas sensor) with a particular area monitor, and also let the platform know that the particular worker is either inside or outside the vessel. Wireless communications will be maintained by the POE Wi-Fi antenna 18A that has been located inside the space to maintain communications with the smart communications device.

The execution of steps 602, 604, and 606 allow for full cloud visibility over the platform 312 established over the cloud network (see FIGS. 3-4) so that HR and other software systems will know that a particular employee is paired with a particular smart communications device, that the particular employee also has possession of a particular gas sensor, and that the particular employee is in or about a particular confined space. Again, the positioning of an employee (determined by the GPS systems on the smart communications device), and the pairing of that employee with a particular sensor allows for a robust system that lets the hub-availed software systems know an employee's current location, track his or her location over time, know if dangerous gases are present, and also allow software programs to determine whether gas exposures are trending towards dangerous levels, etc. The system also allows users of the platform to know which and how many employees are located in or around a particular confined space so that requirements can be met, and violations avoided. For example, if a hole watcher is required every time a worker is in a vessel, the system can affirm the presence of both.

Although in the disclosed embodiments NFC tags are shown in use for identifying a particular smart communications device (and thus, worker) it is possible that other devices, e.g., tags, could be used instead. Therefore, the broad aspects of what is disclosed herein should not be limited to any particular form of identification unless otherwise specified in the claims.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

What is claimed is:

1. A confined space monitoring process comprising:
providing a smart communication device having a readable identifier;
receiving an employee login into the smart communication device to match the smart communication device with an employee;
pairing the smart communication device with a wearable gas sensor device;
locating a portable area monitor device outside a confined space;
coupling a data transmission line from the area monitor device to an antenna inside the confined space to establish a wireless network inside the confined space;
receiving a scanned reading of the readable identifier into the area monitor to establish a presence of the employee at that confined space; and
obtaining data from one of the smart communication device or the gas sensor device from inside the confined space through the area monitor.

2. The process of claim 1, wherein the readable identifier further comprises a readable tag for uniquely identifying the smart communication device.

3. The process of claim 2, wherein the readable tag for uniquely identifying the smart communication device is an NFC tag or an RFID tag.

4. The process of claim 1 wherein a wireless communication pairing process is used to accomplish the pairing of the smart communication device with the wearable gas sensor device.

5. The process of claim 1 further comprising:
connecting one or more display tablets with NFC readers either in or out of the confined space; and
reading the readable identifier using an NFC reader on the display tablet.

6. The process of claim 1 further comprising:
providing a digital telecommunications network;
interfacing the smart communication device and the area monitor in the digital telecommunications network; and
using the area monitor to transmit data between a cloud platform and the smart communications device when the smart communications device is inside of the confined space.

7. The process of claim 6 comprising:
using data received through the area monitor from the smart communications device to manage employees in relation to a work activity performed in the confined space.

8. One or more non-transitory computer-readable media storing computer-executable instructions that, when executed by a processor, perform a method for confined space monitoring, the method comprising:
receiving one or more electronically readable identifiers associated with one or more smart communication devices;
providing, to one or more users, a user login into at least one device in the smart communication devices to match the at least one device with the one or more users;
pairing the at least one device with a wearable environmental sensor device;
identifying a location of a portable area monitor device outside a confined space;
coupling a data transmission line from the portable area monitor device to an antenna inside the confined space to establish a wireless network inside the confined space;
receiving a scanned reading of the one or more electronically readable identifiers into the area monitor to establish a presence of the one or more users at that confined space; and
obtaining from the at least one device or the wearable environmental sensor device, environmental data from inside the confined space through the portable area monitor.

9. The computer-readable media of claim 8, wherein the one or more electronically readable identifiers further comprise a readable tag for uniquely identifying the smart communication device.

10. The computer-readable media of claim 9, wherein the readable tag for uniquely identifying the smart communication device is an NFC tag or an RFID tag.

11. The computer-readable media of claim 8 wherein a wireless communication pairing process is used to accomplish the pairing of the smart communication device with the wearable environmental sensor device.

12. The computer-readable media of claim 8 further comprising:
connecting one or more display tablets with NFC readers either in or out of the confined space; and
reading the readable identifier using an NFC reader on the display tablet.

13. The computer-readable media of claim 8 further comprising:
providing a digital telecommunications network;
interfacing the smart communication device and the area monitor in the digital telecommunications network; and
using the area monitor to transmit the environmental data between a cloud platform and the smart communications device when the smart communications device is inside of the confined space.

14. The computer-readable media of claim 13 comprising:
using safety data received through the area monitor from the smart communications device to manage employees in relation to a work activity performed in the confined space.

15. A method for confined space monitoring comprising:
receiving one or more electronically readable identifiers associated with one or more smart communication devices;
providing a user with a user login into at least one device in the smart communication devices to match the at least one device with the one or more users;
pairing the at least one device with a wearable gas sensor device;
identifying a location of a portable area monitor device outside a confined space;
coupling a data transmission line from the portable area monitor device to an antenna inside the confined space to establish a wireless network inside the confined space;
receiving a scanned reading of the one or more electronically readable identifiers into the area monitor to establish a presence of the one or more users at that confined space; and
obtaining data from the at least one device or the wearable gas sensor device from inside the confined space through the portable area monitor.

16. The method of claim 15, wherein the one or more electronically readable identifiers further comprise a readable tag for uniquely identifying the smart communication device.

17. The method of claim 15 wherein a wireless communication pairing process is used to accomplish the pairing of the smart communication device with the wearable gas sensor device.

18. The method of claim 15 further comprising:
connecting one or more display tablets with NFC readers either in or out of the confined space; and
reading the readable identifier using an NFC reader on the display tablet.

19. The method of claim 15 further comprising:
providing a digital telecommunications network;
interfacing the smart communication device and the area monitor in the digital telecommunications network; and
using the area monitor to transmit data between a cloud platform and the smart communications device when the smart communications device is inside of the confined space.

20. The method of claim 19 comprising:
using data received through the area monitor from the smart communications device to manage employees in relation to a work activity performed in the confined space.

* * * * *